May 27, 1941.  H. L. DE GOLYER  2,243,670
CONVERTIBLE SPOOL REEL
Filed Nov. 14, 1938
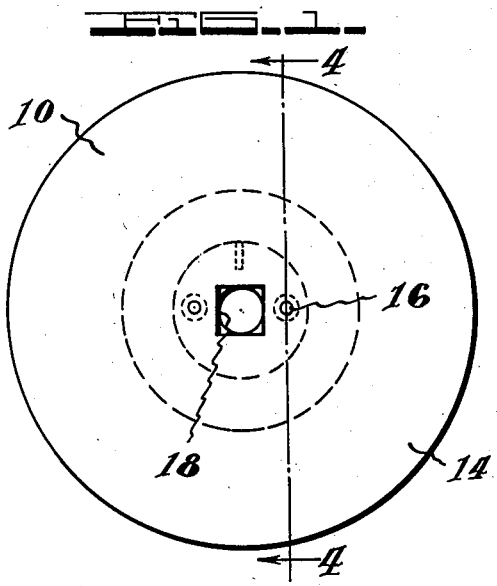
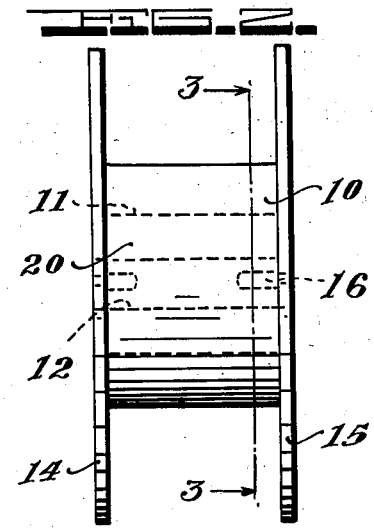
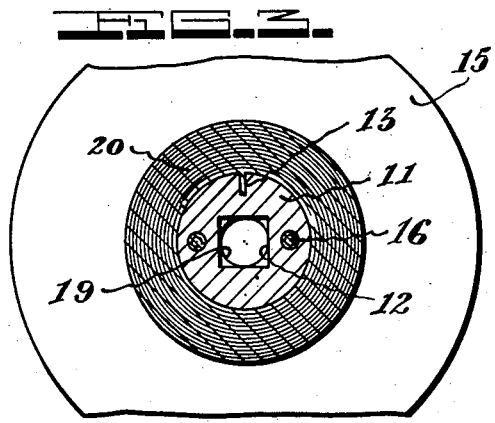
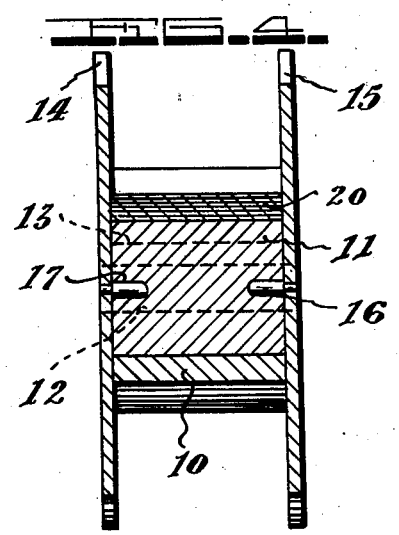
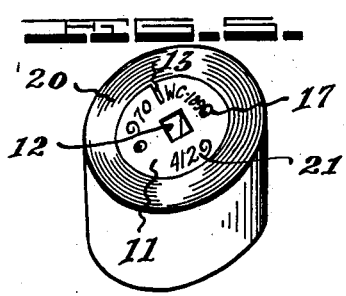
Homer L. DeGolyer
INVENTOR.
BY
ATTORNEY.

Patented May 27, 1941

2,243,670

UNITED STATES PATENT OFFICE 2,243,670

CONVERTIBLE SPOOL REEL

Homer L. De Golyer, Dallas, Tex.

Application November 14, 1938, Serial No. 240,312

1 Claim. (Cl. 242—70).

This invention relates to new and useful improvements in spool-reels for the use of, and permanent filing of microfilm and other types of film.

In the present practice of filing microfilm in the larger libraries enough film is put on each reel to fill the same after which the reel is numbered and identifying means for each item is had by giving the number of the reel upon which it may be found, thus providing for several absolutely unrelated books or items upon the same reel, in some cases as many as twenty or more. It would be the same as if several books were only to be had in one individual binding, and in order to get to any one of which, one would have to handle them all.

In microfilming old and rare books as many as 1600 to 3200 pages may be filmed on a single 100 foot film. With books averaging three to five hundred pages the present method would require that five to ten books be placed on each reel, to utilize its full space and the storage space necessary. Where items of shorter length are concerned, the number of separate items might well run into the hundreds.

One object of the invention is to provide a new type convertible spool-reel whereby a permanent, easily identified spool to which a film may be attached for filing, but which will, with sides attached, be used on a viewing machine the same as the present type reels.

Another object of the invention is to provide a new type spool-reel having detachable side flanges, whereby said flanges may be removed from the spool for filing.

Still another object of the invention is to provide a convertible spool-reel which will enable the users of said spool-reel to attach but a single microfilm copy to a single spool whereby said copy may be filed in minimum amount of time and in a minimum amount of space.

The invention will be more readily understood from a reading of the following specification and by reference to the accompanying drawing wherein means for carrying out the invention are disclosed and wherein:

Figure 1 is a front elevation of a spool-reel constructed in accordance with the invention.

Figure 2 is a view in elevation taken at right angles to Figure 1.

Figure 3 is a transverse vertical sectional view taken on the line 3—3 of Figure 2.

Figure 4 is a transverse vertical sectional view taken on the line 4—4 of Figure 1, and Figure 5 is an isometric view of the spool, with sides detached, ready for filing.

In the drawing the numeral 10 designates a spool-reel constructed in accordance with the invention. A spool 11 is provided with a square axial bore 12 and a transverse slot 13 in the outer periphery thereof. Detachable side flanges 14 and 15 having a pair of permanently attached pins 16 on the inner faces thereof are provided. The pins 16 are arranged to engage holes 17 in the sides of the spool 11.

A central square opening 18 is provided in the flange 14, said opening corresponding to the bore 12 of the spool, and a central circular opening 19 is provided in the flange 15.

In operation a film portion 20 containing a single item is wound around the spool 11, the slot 13 providing a retainer at the end of the film. Suitable identifying marks 21 are placed on one end of the spool and the film may be filed.

With this method, spools containing books or items occupying twenty feet of film may be placed together while larger books or items occupying a larger amount of film may be placed elsewhere. Thus it may be seen that by this method only a single book or item is placed upon a single spool, thereby eliminating the necessity of the handling of any undesired film.

When it is desired to place a spool in a viewing machine, the side flanges 14 and 15 are attached to the spool 11 by means of the pins 16 and holes 17. The square opening 18 in the flange 14 corresponds to the bore 12 due to the placement of the pins 16 and the holes 17.

The usual driving mechanism of a viewing machine (not shown) enters the hole 18, bore 12 and hole 19 in the flange 15 and is suitably secured in the usual manner.

From the foregoing it may be seen that this new convertible spool-reel will make the filing and handling of microfilm copies of books conform to the present methods now in use in all libraries. It will eliminate any confusing cross filing in the card index, and it will permit the handling of each individual item with the same ease and efficiency as if it were an original copy. It is obvious that the side flanges of 14 and 15 can be permanently attached to the viewing machine.

Other than the facile method of handling the item on film, the removal of the sides of the convertible spool-reel leaves only the spool with the film wound thereon, which may be filed in any case now in use or more preferably, in a special case so constructed as to provide the necessary moisture and conditioning for the preservation of any film.

The use of this spool minus its sides for filing, properly identified, for films of items of fifty pages or more would not require any more additional space than the present method of filing. Where there were items of much shorter length, they might be filed together with probably not more than five or ten items on each spool. This would still facilitate the handling of the film.

For example a three hundred page book of folio size microfilmed, double-frame, together with leader, description, and trailer would require a bit over twenty feet of film. If placed on a hundred foot reel with four other books of equal length, the reader would be required to handle all five books, with subsequent wear and tear on the film, in order to view the one book. During the time that the one book was being used, the other books, unless duplicate copies were available, would be out of circulation, which same condition would hold true in the inter library loan of microfilm.

Due to the convertibility of these spools into reels by the attachment of sides the cost of these spools or cores would reduce the cost of filing at the same time that they were increasing its efficiency.

The use of these convertible spool-reels would also simplify the filing of microfilm in the business world where microfilm records are being kept in banks, newspapers, insurance, and many other branches of industry, due to the fact that records covering periods of time may vary from several feet to several hundred feet of film.

Manifestly, the construction as shown and described is capable of some modification and such modification as may be construed within the scope and meaning of the appended claim is also considered to be within the spirit and intent of the invention.

What is claimed is:

As a new article of manufacture, a mounting and identifying means for filing microfilm comprising the combination of a spool bearing on its ends indicia representative of the subject matter of the film wound thereon and having a square axial opening therethrough and opposed pin receiving recesses in either end of said spool, said spool further having a slot in its exterior in parallel relationship with said opening to receive a film end, a flange having pins frictionally receivable in said recesses on one end of said spool having a circular aperture therein in line with one end of the square opening through said spool, a companion flange having a square aperture embracing the opposite end of said square opening and having pins frictionally receivable by the recesses in the opposite end of said spool, said flanges being applicable to said spool and reel when the latter is arranged in a viewing machine, the said apertures in said flanges being adapted to be received by the mechanism of said viewing machine.

HOMER L. DE GOLYER.